UNITED STATES PATENT OFFICE.

ORVAL C. HOOVER, OF JOHNSTOWN, OHIO.

SOLDERING COMPOUND.

No. 877,505.  Specification of Letters Patent.  Patented Jan. 28, 1908.

Application filed April 18, 1907. Serial No. 368,965.

*To all whom it may concern:*

Be it known that I, ORVAL C. HOOVER, a citizen of the United States, residing at Johnstown, in the county of Licking and State of Ohio, have invented certain new and useful Improvements in Soldering Compounds, of which the following is a specification.

This invention is a soldering compound that will act as a flux for hard or soft solder, or gold solder, or on any metal.

The object of the invention is to produce a solder compound which will act on any of the common metals, without corrosion, and without poisonous fumes or odors, and which is harmless to the hands or clothing. It may be used for fluxing steel or black iron, silver, gold, tin and zinc, aluminium, copper, and various other metals, and it will not corrode the finest metal.

The formula and method of preparation of the compound are as follows: For five gallons of the compound, take of borax ten ounces, rosin twenty ounces and sal ammoniac ten ounces. These are ground together and mixed. Then add finely chipped zinc ten pounds, muriatic acid ten quarts, and let stand until the chemical action ceases, and then add soft water ten quarts, cochineal five ounces. Let stand twelve hours, and then add alcohol ten ounces and of glycerin two ounces, and filter, and the liquid compound will be ready for use.

The compound will act without corrosion on any metal. The sal ammoniac, rosin, and borax neutralize the poisonous and corrosive qualities of the acid, and the borax also acts as a flux for steel or black iron, for brazing, and for silver and gold soldering. The glycerin has a tendency to prevent any possible corrosion. The cochineal is used principally for its color, although it has been found by experiment that the compound works better and freer with it than without, the reason for which is not known. The alcohol acts as a preservative so that the compound may be kept indefinitely without deterioration. It will prevent the oxidation on the surface of metals being soldered or brazed, and it does not cause any bad odors when being used. Soldering coppers may be easily and quickly tinned by its use and will not pit when in use as is often the case when an acid flux is used.

I claim:

1. A soldering compound of borax, rosin, zinc, muriatic acid, alcohol and glycerin.

2. A soldering compound consisting of a solution of zinc in muriatic acid, neutralized by the addition of borax, rosin, and sal ammoniac and containing also cochineal, alcohol, and glycerin.

In testimony whereof I do affix my signature, in presence of two witnesses.

ORVAL C. HOOVER.

Witnesses:
　G. G. WILLIAMSON,
　H. G. LAKE.